Dec. 3, 1963  E. M. STOLZ  3,112,955
VEHICLE SEAT CONSTRUCTION FOR CUSHIONING THE FORCE OF IMPACT
Filed April 21, 1961
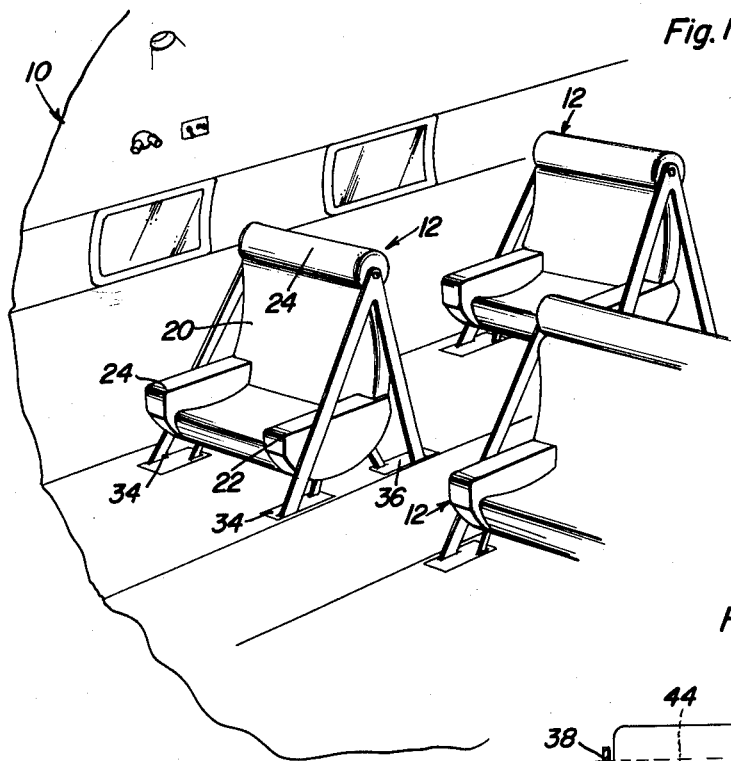
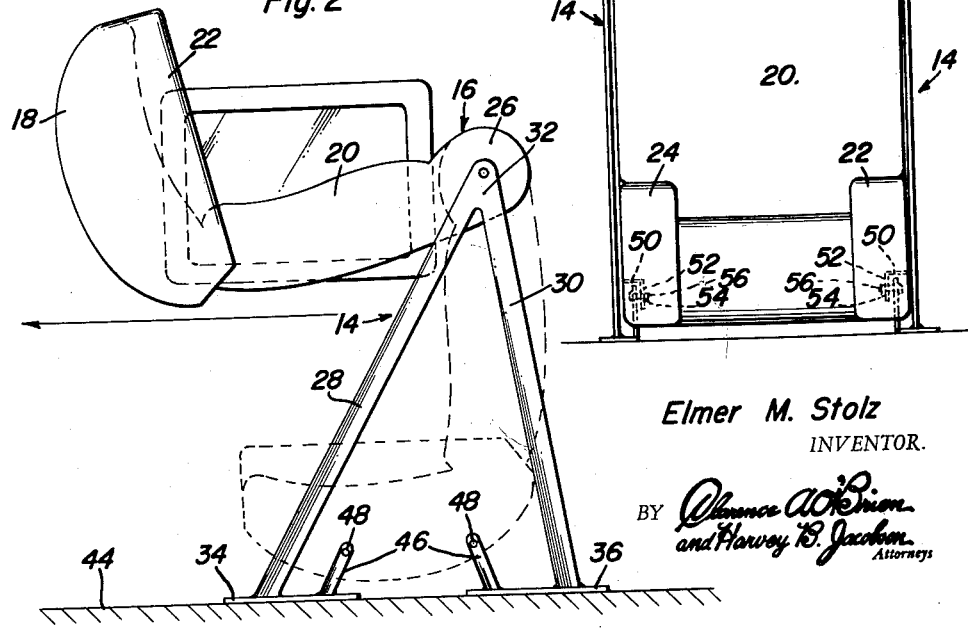
Elmer M. Stolz
INVENTOR.

3,112,955
VEHICLE SEAT CONSTRUCTION FOR CUSHIONING THE FORCE OF IMPACT
Elmer M. Stolz, Sanford Ave., Nokomis, Ill.
Filed Apr. 21, 1961, Ser. No. 104,622
3 Claims. (Cl. 297—216)

This invention relates to novel and useful improvements in vehicle seat constructions and more particularly to a vehicle seat construction specifically adapted for reducing the adverse effects on a passenger during sudden deceleration of a vehicle in which the seat construction of the instant invention is secured.

The vehicle seat construction of the instant invention is specifically adapted for use in passenger type airplanes although it is to be understood that it may also be used to an advantage in other types of vehicles such as trains.

When a vehicle such as a passenger plane crashes and the forward movement of the passenger plane is suddenly decreased the passengers within the plane tend to be thrown forward in the direction of movement. Although seat belts are provided for maintaining a passenger seated in an airplane seat, the conventional forms of seat belts merely include a strap which is secured about the waist of a passenger and to the seat in which the passenger is seated. The seat belt, if the sudden deceleration of the airplane is not too great, will maintain the passenger within the vehicle seat but the upper portion of the torso of the passenger will be thrown forwardly. This sudden movement of the upper portion of the torso of a passenger being thrown forwardly can result in injury which is sufficient to cause the death of the passenger or at least to cause very serious internal injuries. Although some airplanes are additionally provided with shoulder straps to maintain the passenger in an upright position in a seat secured within the airplane, if the sudden deceleration of the airplane upon crashing is sharp enough it is possible that the passenger will incur internal injuries which could also cause subsequent death of the passenger.

Inasmuch as the seat of an airplane decelerates at the same rate at which the airplane decelerates, the passenger strapped within the seat will also decelerate at the same rate. Although seat belts have been provided and are extremely beneficial during periods of not too excessive deceleration, most airplane crashes result in such a sudden and sharp deceleration of the airplane that even the type of seat belts provided with shoulder straps are not sufficient to prevent injury of the passengers on the airplane from being so extensive they cause the death of the passengers.

Accordingly, it is the main object of this invention to provide a vehicle seat construction which, when the vehicle in which the seat construction is secured, decelerates sharply and rapidly, enables the portion of the seat supporting the passenger to move forward in such a manner as to carry the passenger's body forward, up and around an axis, thus converting the forward movement of one of rotation, extending the period of sudden deceleration over a period of time proportional to the force of impact.

A further object of this invention, in accordance with the immediately preceding object, is to provide a vehicle seat construction which will swingably support a vehicle seat for movement about an axis extending transversely of the back rest of the seat and above the seat portion of the seat whereby forward swinging movement of the seat about its axis of rotation upon rapid deceleration of the vehicle in which it is secured will result in the seat being swung to a horizontally disposed position. The swinging movement of the vehicle seat in this manner will not only enable the deceleration of the passenger within the seat to be spread over a longer period of time but will also change the positioning of the passenger relative to the direction of movement of the vehicle in a manner whereby the passenger's head will be disposed rearmost in the direction of travel and his seat will be disposed forwardmost in the direction of movement of the vehicle thereby enabling the major portion of the impact of deceleration of the passenger to be directed downwardly through the body of the passenger and in a direction substantially perpendicular to the seat portion of the seat by which the passenger is supported. In this manner, the tendency of the extremities of the passenger to swing forwardly of the torso of the passenger is greatly reduced inasmuch as the passenger's position relative to the airplane has been changed from a vertical position to a horizontal position relative to the longitudinal axis of the airplane.

Still another object of this invention is to provide a means for securing the vehicle seat in a normal position relative to the airplane whereby when the airplane is flying level the seat will be positioned in the customary manner, enabling the passenger seated therein to assume an upright position.

A still further object of this invention is to provide the means by which the vehicle seat is secured in an upright position with means for releasing the seat in response to a sharp reduction of speed of the airplane whereby upon a sharp reduction of the speed of the airplane the seat will be mounted for free swinging movement relative to the airplane.

Another object of this invention is to provide the means for releasably securing the seat in a normal position with a retaining element which may be automatically sheared upon a sharp reduction of the speed of the airplane and the tendency of the seat to swing forwardly relative to the airplane thereby channeling or converting the force of momentum into a curved path of movement and lengthening the period of time during which a given amount of deceleration is experienced by the passenger in the seat.

A final object to be specifically enumerated herein is to provide a vehicle seat construction which will conform to conventional forms of manufacture, be of simple construction and easy to install so as to provide a device that will be economically feasible, long lasting and relatively easy to install.

These together with other objects and advantages which will become subsequently apparent reside in the details of construction and operation as more fully hereinafter described and claimed, reference being had to the accompanying drawing forming a part hereof, wherein line numerals refer to like parts throughout, and in which:

FIGURE 1 is a fragmentary perspective view of a portion of an airplane cabin showing several seats constructed in accordance with the present invention mounted therein, parts of the airplane being broken away and shown in section;

FIGURE 2 is a fragmentary enlarged longitudinal vertical sectional view taken substantially along the longitudinal center line of the airplane and showing the seat of one of the vehicle seat constructions swung forwardly in the direction of movement of travel of the airplane, the conventional or normal position of the seat being shown in phantom lines; and FIGURE 3 is a front elevational view of one of the vehicle seat constructions illustrated in FIGURE 1.

Referring now more specifically to the drawings the numeral 10 generally designates a portion of the cabin of an airplane in which there is mounted a plurality of seat constructions generally designated by the reference numerals 12. Each of the seat constructions 12 includes a pair of laterally spaced upright side members generally designated by the reference numeral 14. The side members 14 comprise the means by which the seat generally referred to by the reference numeral 16 is mounted within the airplane cabin 10. The seat 16 includes a seat portion 18 and a back rest portion 20. The seat portion may, of course, be provided with arm rests 22 and 24 and it will be noted that the seat back portion 20 includes an upper portion 26 adapted to be engaged by the head of a passenger within the seat 16. The portion of the seat back 20 disposed below the upper portion 26 of course is designed to provide support for the back and shoulders of the passenger within the seat 16.

It will be noted that each of the upright side members 14 is generally inverted V-shaped in configuration and includes a pair of mounting legs 28 and 30. The upper ends of the legs 28 and 30 are interconnected to form an apex portion 32 and the lower ends of the leg members 28 and 30 include mounting bases 34 and 36, respectively.

The apex portions 32 are provided with aligned apertures 38 comprising means for journaling the opposite end portions 40 and 42 of the transverse axle member 44 which is secured through the upper portion 26 of the seat back 20. In this manner, the seat 16 is swingably mounted between the upright side members 14 for movement about an axis extending transversely of the airplane cabin 10 and through the upper portion 26 of the seat back 20.

It will be noted that the base members 34 and 36 of each of the upright side members 14 may be secured to the floor 44 of the upright cabin 10 in any convenient manner. Additionally, each of the base members 34 is provided with an upright support arm 46 which is apertured at its upper end as at 48. The seat portion 18 includes a pair of L-shaped brackets which project inwardly toward each other and terminate in downturned vertically disposed end portions paralleling the corresponding support arms 46. The downturned portions 52 are provided with apertures 54 aligned with the corresponding apertures 48 in the support arms 46 and a shear pin 56 is passed through corresponding pairs of aligned apertures 54 and 48.

Thus, it will be noted that the shear pins 56 prevent the free swinging movement of the seat 16 about its axis of rotation defined by the transverse axle 40.

In operation, a passenger may be strapped within the seat 16 in the usual manner by means of seat belts (not shown). Then, should the airplane 10 decelerate sharply upon crashing, the shear pins 56 will be sheared in half and the seat 16 will swing forwardly and upwardly from the position illustrated in phantom lines in FIGURE 2 of the drawings to the position illustrated in solid lines. A portion of the impact is initially absorbed by the shear pins 56 and the remainder of the impact of the rapid deceleration of the airplane 10 is absorbed over the period of time it takes the seat 16 to swing from the dotted line position shown in FIGURE 2 to the solid line position. Thus, the remaining force of impact is expended over a period of time during the pivotal movement of the seat 16. A passenger secured in the seat 16 by means of seat belts not only experiences less rapid deceleration than does the support means for the seat 16 comprising the side members 14, but his position relative to the direction of movement of the airplane 10 is changed enabling the majority of the impact of rapid deceleration to be transmitted downwardly through the body of the passenger rather than at right angles to the back of the passenger.

Thus, it may be observed that the seat construction 12 not only extends the initial impact of rapid deceleration of the airplane over a longer period of time thereby enabling the passenger within the seat construction 12 to more readily endure the rapid deceleration of the airplane but also rotates the seat 16 in order to enable the impact of the sharp deceleration of the airplane 10 to be absorbed through the seat of the passenger and along a line generally paralleling the back and neck of the passenger thereby greatly reducing the possibility of the neck or back of the passenger within the seat 16 being broken during rapid deceleration of the airplane 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle seat construction for reducing the adverse effects on a passenger during sudden deceleration, said seat construction comprising a support including upright side members adapted to be rigidly secured in a vehicle, a seat including a seat portion, means swingably mounting said seat between said side members for free rotation movement completely about an axis spaced above the center of gravity of said seat and the seat portion thereof and extending transversely thereacross, and means releasably and rigidly securing said seat in a normal position and comprising shearable securing means, shearable under the inertia of an adjacent portion of said seat upon an abnormal sharp reduction of speed of said support for releasing said seat and enabling free swinging movement of the latter, said shearable securing means comprising the sole means for retaining said seat in said normal position, said seat including a normally upright seat back portion having a headrest portion on an upper end, said axis being disposed above said seat portion and in general horizontal alignment with said headrest portion, said shearable means comprising at least one shear pin connected between said seat portion and one of said side members below said axis of rotation.

2. The combination of claim 1 wherein said support includes a pair of laterally spaced upright side members, said seat portion and back rest portion disposed between said upright side members.

3. The combination of claim 2 wherein said seat back portion includes axle end portions projecting from opposite sides thereof, said means swingably mounting said seat comprising journal means carried by said side members rotatably journaling said axle end portions.

References Cited in the file of this patent

UNITED STATES PATENTS

| | | |
|---|---|---|
| 193,731 | Simonson | July 31, 1877 |
| 2,402,974 | Morse | July 2, 1946 |
| 2,433,950 | Henderson | Jan. 6, 1948 |
| 2,637,368 | Cotton | May 5, 1953 |
| 2,712,849 | Exton | July 12, 1955 |
| 2,777,531 | Erickson | Jan. 15, 1957 |
| 2,993,732 | Walker | July 25, 1961 |

FOREIGN PATENTS

| | | |
|---|---|---|
| 244,903 | Great Britain | Dec. 31, 1925 |